(12) United States Patent
Patterson et al.

(10) Patent No.: US 6,322,369 B1
(45) Date of Patent: Nov. 27, 2001

(54) CHRISTIAN LEARNING TOOL

(76) Inventors: Yetta L. Patterson; Derek X. Patterson, both of 19403 Caravan Dr., Germantown, MD (US) 20874

( * ) Notice: Subject to any disclaimer, the term of this patent is extended or adjusted under 35 U.S.C. 154(b) by 0 days.

(21) Appl. No.: 09/421,228

(22) Filed: Oct. 20, 1999

(51) Int. Cl.[7] .................................................. G09B 19/00
(52) U.S. Cl. .............................. 434/245; 434/317; 428/3; 446/143
(58) Field of Search .................................. 428/3; 434/245, 434/317, 319; 446/143, 397, 484, 485

(56) References Cited

U.S. PATENT DOCUMENTS

| D. 291,989 | | 9/1987 | Roach et al. . | |
| D. 318,306 | | 7/1991 | Cheung . | |
| D. 321,186 | | 10/1991 | Blinn et al. . | |
| D. 387,056 | | 12/1997 | Yoneyama . | |
| D. 392,321 | | 3/1998 | Chan . | |
| D. 397,338 | | 8/1998 | Gray . | |
| 2,643,899 | * | 6/1953 | Cavalero | 428/3 |
| 3,964,179 | | 6/1976 | Bennett . | |
| 4,445,196 | | 4/1984 | Gonet . | |
| 4,493,652 | | 1/1985 | Mike . | |
| 4,642,054 | | 2/1987 | Wada . | |
| 4,855,725 | * | 8/1989 | Fernandez | 434/317 X |
| 5,145,447 | * | 9/1992 | Goldfarb | 446/397 X |
| 5,184,971 | * | 2/1993 | Williams | 446/142 |
| 5,209,665 | * | 5/1993 | Billings et al. | 434/317 X |
| 5,368,308 | * | 11/1994 | Darnell | 434/319 X |
| 5,382,188 | | 1/1995 | Tomellini . | |
| 5,433,610 | | 7/1995 | Godfrey et al. . | |
| 5,449,177 | | 9/1995 | Naylor . | |
| 5,474,484 | | 12/1995 | Lemelle . | |
| 5,595,489 | * | 1/1997 | Kwon | 434/319 |
| 5,609,508 | | 3/1997 | Wingate . | |
| 5,636,995 | * | 6/1997 | Sharpe, III et al. | 434/317 |
| 5,803,748 | | 9/1998 | Maddrell et al. . | |
| 5,829,985 | | 11/1998 | Campanella . | |
| 5,924,869 | | 7/1999 | Haas . | |
| 5,954,514 | * | 9/1999 | Haas et al. | 434/317 X |
| 6,179,682 | * | 1/2001 | Plain et al. | 446/397 X |

* cited by examiner

Primary Examiner—D. Neal Muir
(74) Attorney, Agent, or Firm—Richard C. Litman

(57) ABSTRACT

The Christian learning tool is an educational toy having a base in the shape of an open Bible, the top surface of the base being divided into a left side and a right side. The left side has a cradle defined therein receiving a pair of praying hands attached to the base by a tether and having a plurality of apertures for emitting sound from a speaker. The right side has three sets of buttons disposed thereon, including a set of category selector buttons for selecting either the Ten Commandments or the Beatitudes, a set of ten topic selector buttons in the form of a telephone keypad for selecting one of the Ten Commandments or one of the Beatitudes for audio replay, and a third set of buttons for selecting audio replay of a story about either the birth or death of Christ.

16 Claims, 4 Drawing Sheets

CHRISTIAN LEARNING TOOL

BACKGROUND OF THE INVENTION

1. Field of the Invention

The present invention relates to an entertaining device for teaching Christian principles by rote. More specifically, the invention relates to an electronic teaching toy for reproducing prestored biblical stories and verses.

2. Description of the Related Art

Many devices have been used over time for educating young children on various topics, ideologies, and theories. Many of these devices include a telephone handset, or other simulative hand held article for a child user to pretend to talk on the phone while learning. In addition, many of these devices have pre-recorded messages, songs, alphabets, numbers, etc. that the child listens to in order to learn. The prior art has many representative devices for telephone structures, learning devices, and entertaining devices.

Some examples are U.S. Pat. No. Des. 291,989 issued Sep. 22, 1987, to Roach, shows a praying hands telephone handset cradle. U.S. Pat. No. Des. 318,306 issued Jul. 16, 1991, to Cheung, shows an electronic toy having a telephone handset. U.S. Pat. No. Des. 321,186 issued Oct. 29, 1991, to Blinn et al., shows a telephone set in the form of a hand. U.S. Pat. No. Des. 387,056 issued Dec. 2, 1997, to Yoneyama, shows a business telephone set. U.S. Pat. No. Des. 392,321 issued Mar. 17, 1998, to Chan, shows a toy teaching device. U.S. Pat. No. Des. 397,338 issued Aug. 25, 1998, to Gray, shows a cellular telephone in the form of a hand. U.S. Pat. No. 3,964,179 issued Jun. 22, 1976, to Bennett, discloses a telephone teaching system that utilizes a functioning telephone to educate children in various areas. U.S. Pat. No. 4,445,196 issued Apr. 24, 1984, to Gonet, discloses an electronic hand held bible. U.S. Pat. No. 4,493,652 issued Jan. 15, 1985, to Mike, discloses an inspirational teaching apparatus having a display of an inspirational symbol and a printed message appearing while an audio track reads the message. U.S. Pat. No. 4,642,054 issued Feb. 10, 1987, to Wada, discloses a children's picture book having a telephone dial therein. U.S. Pat. No. 5,382,188 issued Jan. 17, 1995, to Tomellini, discloses an audio playback device having a telephone handset and a plurality of images. Upon selecting an image, the device plays an audio recording of the image as if speaking through the handset.

U.S. Pat. No. 5,433,610 issued Jul. 18, 1995, to Godfrey et al., discloses an educational device for accelerating learning in recognition, language acquisition, awareness, cause and effect, and association. U.S. Pat. No. 5,449,177 issued Sep. 12, 1995, to Naylor, discloses a biblical educational board game for teaching biblical knowledge in the context of three biblical characteristics of humankind, as presented in the Bible. U.S. Pat. No. 5,474,484 issued Dec. 12, 1995, to Lemelle, discloses a doll for teaching children how to dial the emergency number (typically '911') by disposing a simulated telephone in the chest of the doll. The telephone also includes an audio tape for instructing the child as to what to do. U.S. Pat. No. 5,609,508 issued Mar. 11, 1997, to Wingate, discloses a toy telephone having audio and visual outputs. U.S. Pat. No. 5,803,748 issued Sep. 8, 1998, to Maddrell et al., discloses an electronic book having visual indicia on the leaves of the book. Upon pressing the indicia, an audible sound is produced related to the indicia. U.S. Pat. No. 5,829,985 issued Nov. 3, 1998, to Campanella, discloses a children's game device that allows a child to interactively participate with an electronic storybook by drawing characters and recording the child's voice. U.S. Pat. No. 5,924,869 issued Jul. 20, 1999, to Haas, discloses a devotional and learning device emulating a scroll. Individual frames of the scroll display scripture passages, prayers, quotations, etc.

None of the above inventions and patents, taken either singularly or in combination, is seen to describe the instant invention as claimed. Thus a Christian learning tool for developing Christian principles is desired.

SUMMARY OF THE INVENTION

Since the time of Moses, "The Ten Commandments" have been revered by generations of people as God's supreme law for humankind. These ten instructions from God are the foundation of morality. Additionally, Jesus gave us ways to achieve happiness and receive God's promise. These ways are described in the "Beatitudes." Yet these guidelines for living have been the source of controversy, labeled as politically incorrect and offensive to those who do not share the Judeo-Christian belief system. As we approach the 21st century, our moral ambiguity has led to a morass of drug and alcohol addiction, violence, murder, and lawlessness that seems insurmountable. Even our schools, as evidenced by the numerous massacres around the United States and the world in recent months, are no longer safe havens for learning and development, but are now halls of fear, marked by gun detectors, security guards, and hidden cameras. For many, the situation seems hopeless. We must, however, remember that God sent his son Jesus to overcome the world, and with him we have hope. Our faith in God is our shield against evil, and His Word our weapon.

In keeping with God's ordinance to teach our children His commandments, we have, with God's help, designed an innovative Christian learning tool that makes it easy for young children (typically, ages 2–5 years old) to learn "The Ten Commandments," "The Beatitudes," and other Bible verses. This toy will expose children at an early age to important biblical principles at the push of a button. This tool is also intended to be a fun alternative to TV or video games, as children discover themselves and their purpose in the world through lending their ears and their hearts to God.

Children need to know that God is completely approachable and always available to hear what they want to tell him. The instant invention is an educational and entertaining device that lets children know that they can talk to God and that God speaks to them through His Word and will always help and guide them. The simulated telephone concept implies that God is easy to talk to and hearing His Word can be as simple as pressing a button. Children will naturally gravitate to this simulated telephone. It also serves as a tool for teaching young children how to count. Parents will be encouraged to observe and assist their children in learning and understanding Bible verses, which are spoken from prestored memory banks in the device.

This Christian educational device will aid parents and educators in teaching children the Word of God diligently in their homes, schools, churches, synagogues, and other places of worship or activity. This easy-to-use Christian educational device will also encourage and support closeness and bonding between parents and their children as parents talk with their children about what the Bible verses mean. Understanding the verses of the Bible is the key ingredient to understanding Christian principles. The Christian learning tool of the present invention provides an avenue for parents to engage in important discussions with their children.

The device has a base in the shape of an open Bible. A flesh colored simulated receiver, shaped like praying hands, rests on the left side of the base, and is tethered to the base. Surrounding the simulated receiver are the words 'FAITH', 'PEACE', 'LOVE', and 'JOY' displayed in child-like handwritten font. The right side of the base has twelve buttons having numerals or symbols imprinted thereon. The buttons are in a standard telephone arrangement, however, unlike a conventional telephone, the number '0' is replaced by the number '10'. In addition, the asterisk or star symbol is replaced with a 'Star of Bethlehem' icon. Likewise, the pound sign is replaced with a cross icon. When depressed, the 'Star of Bethlehem' button will actuate the device to replay the birth story of Jesus. Similarly, when the cross button is depressed, the device will replay the death and resurrection story of Jesus.

Below the twelve buttons, there are two elongated rectangular category buttons, one of which is labeled 'Ten Commandments' and the other 'The Beatitudes'. In conjunction with the numbered buttons, the device will replay the 'Ten Commandments' or 'The Beatitudes', by the selection of the category button followed by a numeral selection (i.e., 1–10).

Accordingly, it is a principal object of the invention to provide an educational, entertaining device.

It is another object of the invention to provide a toy device that simulates a telephone.

It is a further object of the invention to provide a simulated telephone toy device capable of producing audible messages.

Still another object of the invention is to provide a simulated telephone toy device capable of producing audible messages divided into categories and topics, and stories.

It is yet another object of the invention to provide a simulated telephone toy device having a circuit for producing audible messages to be learned by rote.

It is yet a further object of the invention to provide a simulated telephone toy device having the form of an open Bible.

Still yet another object of the invention is to provide a simulated telephone toy device having the form of an open Bible having a pair of praying hands tethered thereto.

It is still yet another object of the invention to provide a simulated telephone toy device in the shape of an open Bible having a pair of praying hands tethered thereto, with a multiplicity of buttons for selectively recalling a prerecorded message.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 2:
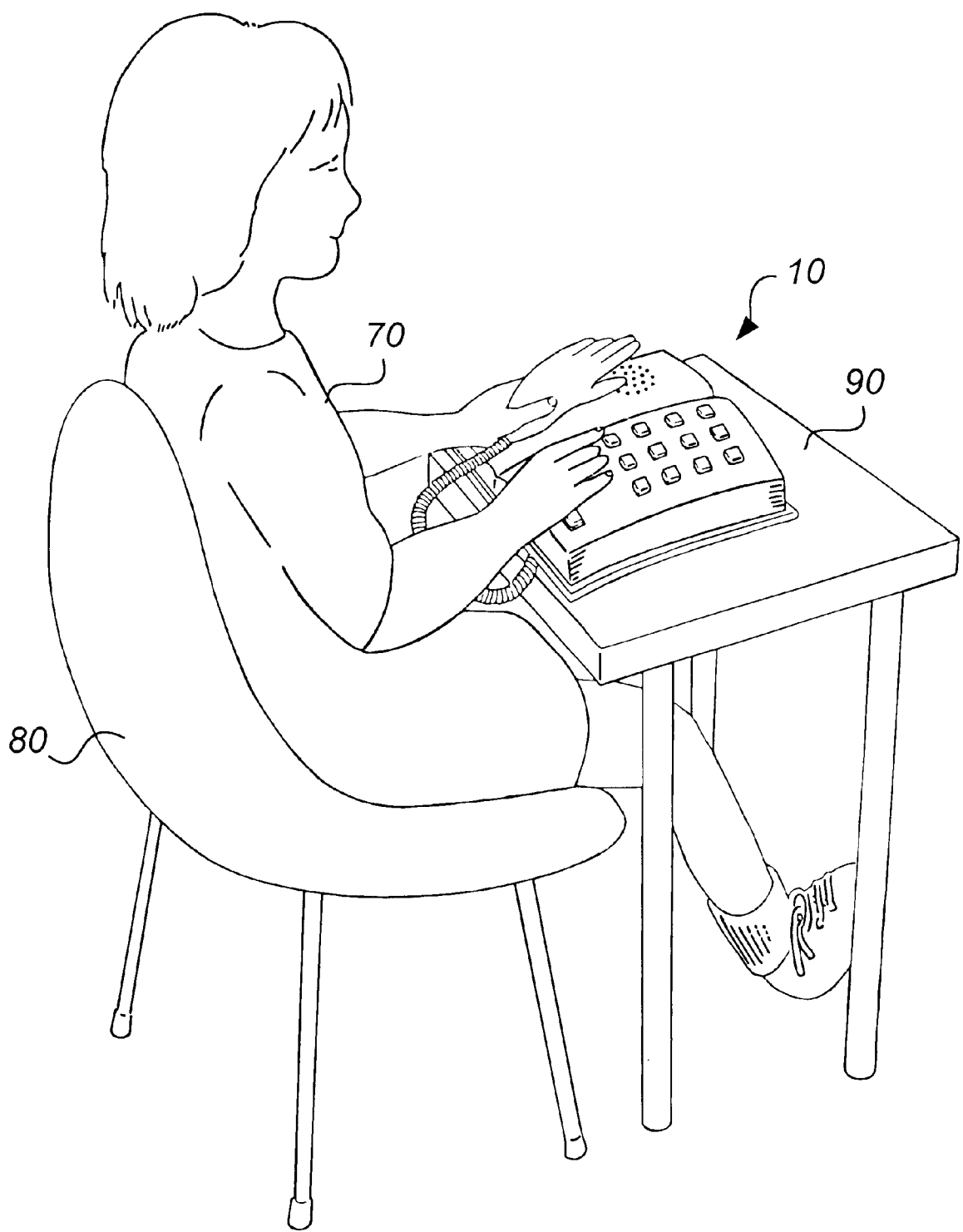
FIG. 2 is an environmental view of the Christian learning tool according to the present invention being used by a child.

The present invention is an electronic educational tool that is entertaining and appealing. The Christian learning tool is in the form of a simulated telephone that replays prestored messages selected by a user, preferably a child. Referring to FIG. 2, a child 70 is shown in a typical learning and playing situation. The child 70 is shown seated in a chair 80 at a table 90. On the table 90, the child 70 is playing with a toy 10 embodying the Christian learning tool according to the present invention. The toy 10, as shown in FIG. 2, may rest upon the table 90, however, the toy 10 may also be utilized in the lap of the child 70 while sitting in the chair 80, or on the floor (not shown).

Figure 1:
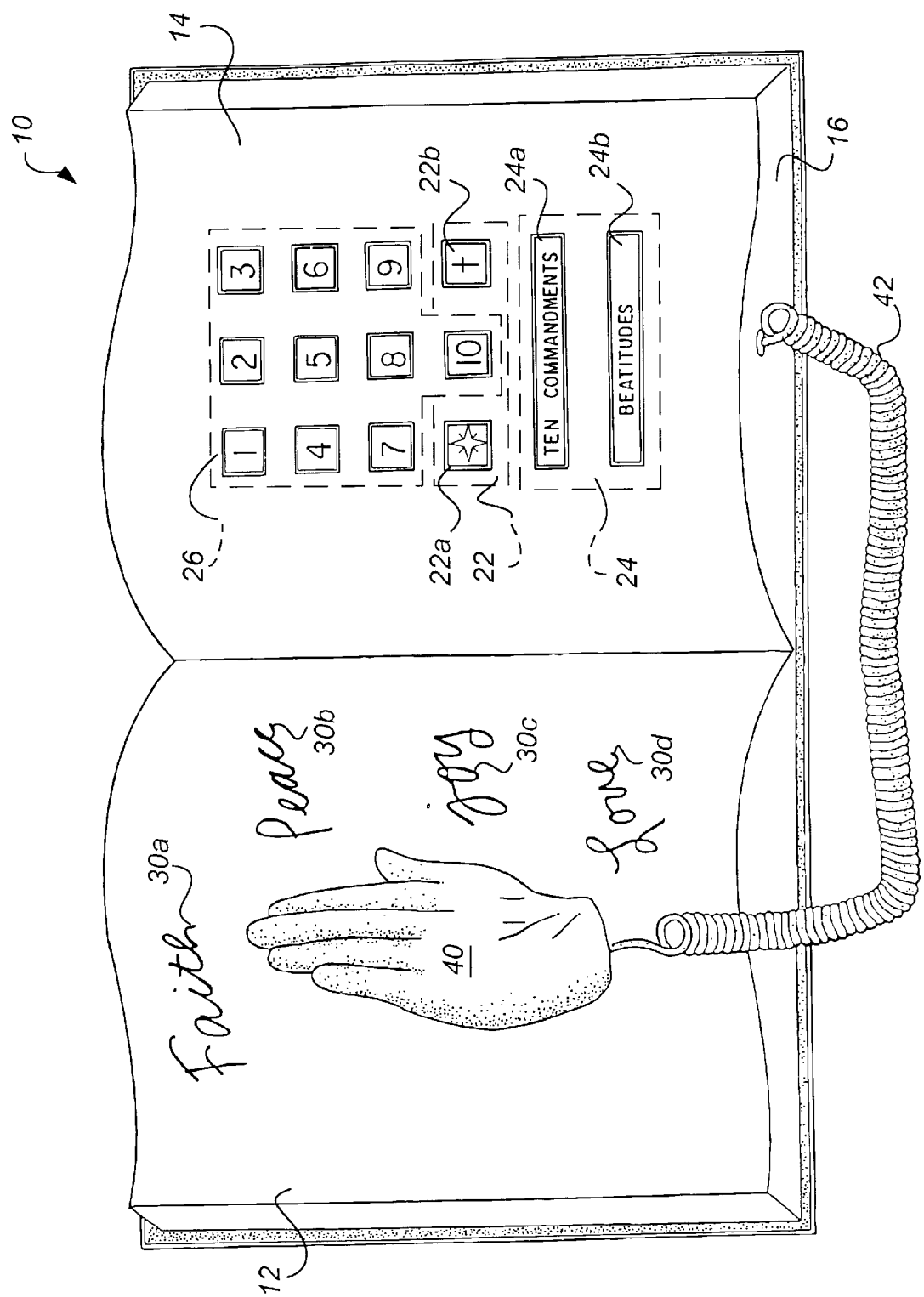
FIG. 1 is a plan view of a Christian learning tool according to the present invention.
Figure 3:
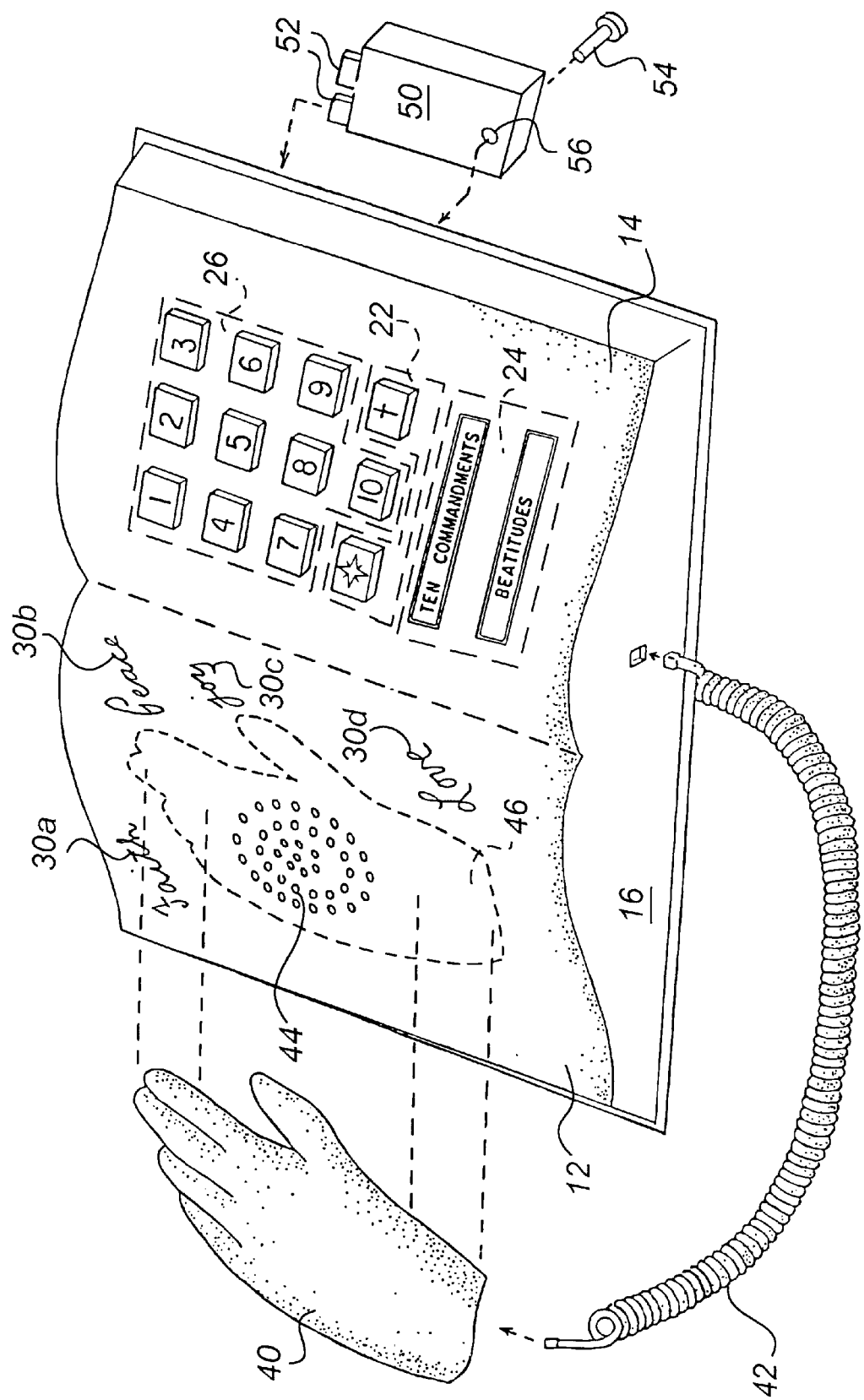
FIG. 3 is an exploded, perspective view of the Christian learning tool according to the present invention.

Referring to FIGS. 1 and 3, the toy 10 of the instant invention is shown in greater detail. The toy 10 is in the form of a simulated telephone. The toy 10 has a base member 16 shaped in the form of an open Bible. The base member 16 has a top surface which is generally divided into a first, left side 12 and a second, right side 14 corresponding to the left and right pages of an open book. The first, left side has a cradle 42. The cradle 42 has a symmetric array of apertures 44 for passing audible tones therethrough, the audible tones emanating from a speaker 68 housed within the base member 16. The first, left side 12 also has indicia imprinted thereon. The indicia is preferably the words 'FAITH' 30A, 'PEACE' 30B, 'LOVE' 30D, and 'JOY' 30C displayed in a child-like handwritten font, surrounding the cradle 42.

The second, right side 14 of the base 16 has at least 14 buttons having numerals, words, or symbols imprinted thereon. The buttons are divided into three independent sets of buttons 22, 24, 26. The first set 26 of buttons are in a standard telephone arrangement, however, unlike a conventional telephone, the number '0' is replaced the number '10'. The second set 22 of buttons are typically positioned in accordance with the asterisk or star and the pound sign also in a standard telephone arrangement. However, the asterisk or star symbol is replaced with a 'Star of Bethlehem' icon on button 22A. Likewise, the pound sign is replaced with a cross icon 22B. The third set 24 of buttons include at least two buttons for selecting a category. The buttons of the third set are preferably labeled as 'Ten Commandments' 24A and 'The Beatitudes' 24B.

The base 16 has a tether 42 connected thereto. The tether 42 is also connected to a simulated receiver 40. The simulated receiver 40 is in the shape corresponding to a pair of praying hands. The simulated receiver 40 is used by the child 70 to pretend he is talking on the telephone to God, holding the praying hands between his hands while he is praying or in any other suitable usage.

Figure 4:
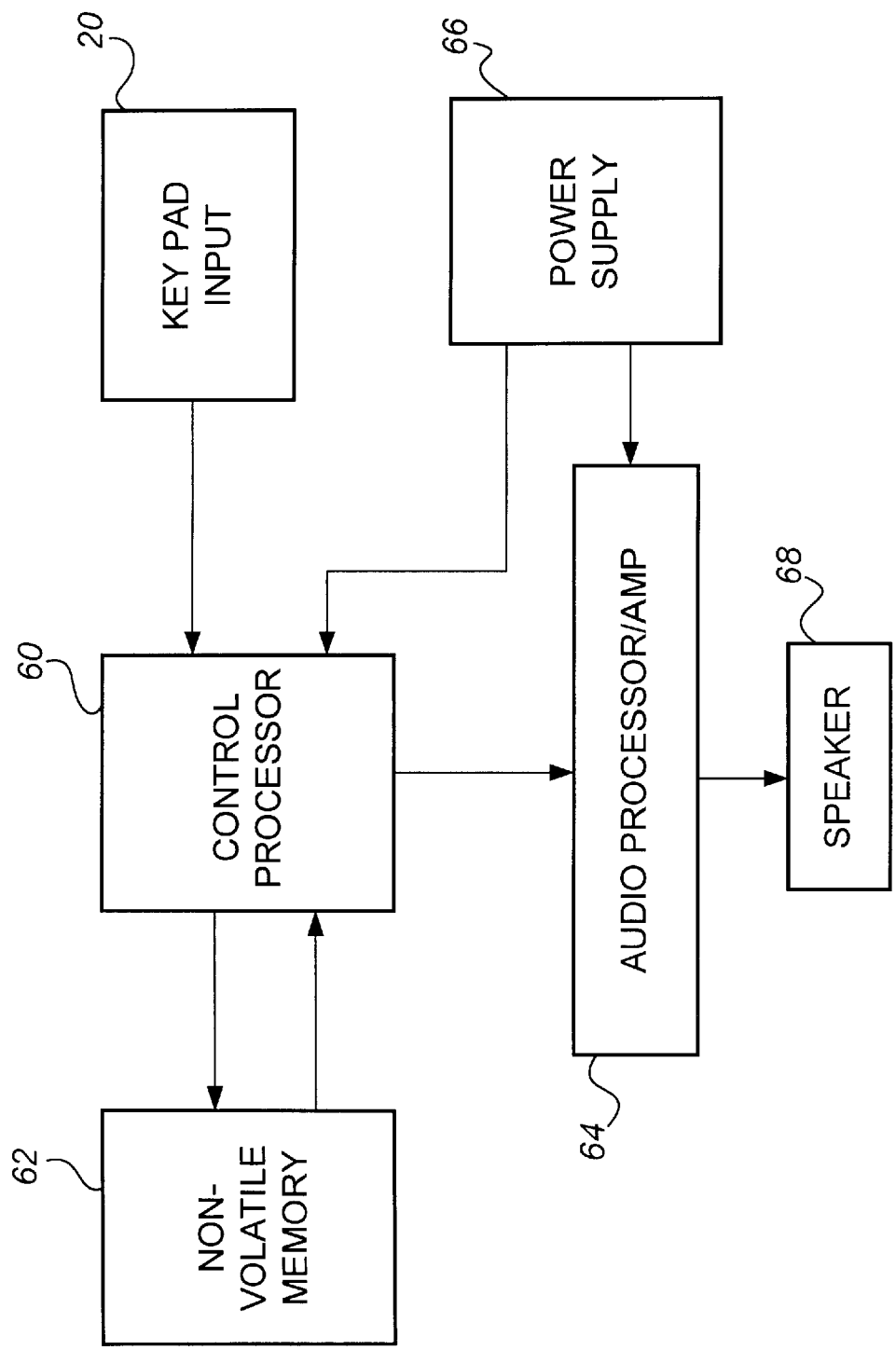
FIG. 4 is a block circuit diagram of the electronic components of the Christian learning tool according to the present invention.

The base 16 includes a power supply compartment (also not shown) housing a power supply 66. The power supply compartment has a removable door 50 for selectively accessing the compartment. The removable door is illustrated as a panel having at least one tab 52 for insertion into a corresponding aperture in the bottom surface of the base 16, and a fastener, typically a screw 54, for securing the door 50 to the bottom surface, via a fastener hole 56 defined in the door 50. The power supply compartment is sized and configured for holding an appropriate number of dry cell batteries, or an AC/DC converting adapter and cord for use with a standard electrical outlet. In FIG. 4, a power supply is shown by power supply block 68 and encompasses either or both of batteries, and AC/DC converting adapter and cord.

In use, the child 70 initiates the toy by depressing one of the category buttons 24, selecting either the 'Ten Commandments' 24a or 'The Beatitudes' 24B. When the 'Ten Commandments' 24A button is depressed, the child 70 hears "And God spoke all these words," while the toy 10 recalls the biblical passages and assigns each of the numbered buttons of the first set 26 of buttons. Subsequently, the child may depress any of the buttons marked 1–10 of the first set 26 and the toy will respond according to the following:

Button #1: "Commandment #1, You shall have no other gods before me."

Button #2: "Commandment #2, You shall not make unto thee any graven image."

Button #3: "Commandment #3, You shall not take the name of the Lord thy God in vain."

Button #4: "Commandment #4, Remember the Sabbath day, to keep it holy."

Button #5: "Commandment #5, Honor thy father and thy mother."

Button #6: "Commandment #6, You shall not kill."

Button #7: "Commandment #7, You shall not commit adultery."

Button #8: "Commandment #8,You shall not steal."

Button #9: "Commandment #9, You shall not bear false witness against thy neighbor."

Button #10: "Commandment #10, You shall not covet thy neighbor's house, nor thy neighbor's wife, nor anything that is thy neighbor's."

Likewise, when the 'The Beatitudes' 24B button is pressed, the child will hear "Jesus began to teach them saying" (the Beatitudes, St. Matthew 5: 3–11); the toy 10 recalls these biblical passages and assigns each of the numbered buttons of the first set 26 of buttons. Subsequently, the child may depress any of the buttons marked 1–9 of the first set 26 and the toy will respond according to the following:

Button #1: "Beatitude #1, Blessed are the poor in spirit, for theirs is the Kingdom of Heaven."

Button #2: "Beatitude #2, Blessed are they that mourn, for they shall be comforted."

Button #3: "Beatitude #3, Blessed are the meek, for they shall inherit the earth."

Button #4: "Beatitude #4, Blessed are they that hunger and thirst after righteousness, for they shall be filled."

Button #5: "Beatitude #5, Blessed are the merciful, for they shall obtain mercy."

Button #6: "Beatitude #6, Blessed are the pure in heart, for they shall see God."

Button #7: "Beatitude #7, Blessed are the peacemakers, for they shall be called the sons of God."

Button #8: "Beatitude #8, Blessed are they that are persecuted for righteousness' sake, for theirs is the Kingdom of Heaven."

Button #9: "Beatitude #9, Blessed are ye, when men shall revile you, and persecute you, and shall say all manner of evil against you falsely, for my sake."

The third set 22 of buttons have the 'Star of Bethlehem' 22A and the cross icon 22B. These buttons work independently of the first set 26 and second set 24 of buttons. By the depressing the 'Star of Bethlehem' 22A button, the child 70 will hear a narrative of Jesus' birth, as follows:

"Jesus, the Son of God, was born in Bethlehem about 2000 years ago. After he was born, men from the East came to bring gifts to the child who was destined to be King of Kings. Angels appeared announcing the birth of the child that would save his people from their sins. He lived a perfect life, teaching others the ways of His Father God, performing great miracles, and healing all who sought his help."

Likewise, when the cross button 22B is depressed, the child 70 will hear a narrative of the death and resurrection of Jesus, as follows:

"Although Jesus always treated others with love and kindness, he was not loved by everyone. His enemies plotted to kill him, not believing that he was the Son of God. When he died on the cross, the sky became dark and there was a great earthquake. His body was placed in a cave and a large stone was rolled in front of it. Three days later, an angel came down from heaven and rolled back the stone and announced that Jesus had risen from the dead. Many people saw him as he walked through the city. Before he was miraculously taken up to heaven to prepare a place for us, he told his followers to preach the good news of his life, death, and resurrection, and to not be afraid because he had overcome the world."

The ability of the toy 10 to replay these messages is accomplished by the electronic circuitry found internally of the housing base. Referring to FIG. 4, the replayed messages are generated through a speaker 68. The three sets of buttons 22, 24, 26 are combined in the keypad input 20 of the FIG. 4. The previously described power supply 66 provides the necessary power to the control processor 60 and the audio processor and amplifier 64. The circuit also includes a non-volatile memory module 62, which does not required an active presence of the power supply in order to retain the pre-recorded messages.

When the child 70 depresses a button, the keypad input 20 submits a signal to the control processor 60. The control processor 60 determines the appropriate message and inquires the memory module 62 for the corresponding prestored message. The memory module 62 replies with the prestored message to the control processor 60. The control processor 60 then submits the message to the audio processor and amplifier 64. The audio processor and amplifier 64 receives the memory message, converts the message into an audio signal and amplifies the audio signal. The amplified audio signal is submitted to the speaker 68 and subsequently heard by the child 70.

This inspirational toy will bring our nation back to God in a way that we have never before witnessed, starting with our children.

It is to be understood that the present invention is not limited to the embodiments described above, but encompasses any and all embodiments within the scope of the following claims.

We claim:

1. A simulated telephone toy device for teaching biblical principles comprising:

a base member shaped in the form of an open book, said base member having a top surface, the top surface having a left side and a right side, the left side having indicia thereon;

a tether having a first end and a second end, said first end coupled to said base;

a power supply compartment cover removably attached to said base, the cover for selectively accessing a power supply compartment;

a simulated receiver being coupled to the second end of said tether;

a first set of buttons, a second set of buttons, and a third set of buttons, said first, second and third sets of buttons being disposed on the right side of said base; and the left side of the top surface of said base having a cradle defined therein for holding said simulated receiver, said cradle having apertures for passing audible tones therethrough.

2. The simulated telephone toy device according to claim 1, wherein said first set of buttons comprises a plurality of category selector buttons for selecting a category from the group consisting of the Ten Commandments and the Beatitudes.

3. The simulated telephone toy device according to claim 2, wherein said second set of buttons comprises a plurality of topic selector buttons for selecting an enumerated Commandment or Beatitude.

4. The simulated telephone toy device according to claim 1, wherein said third set of buttons comprises a plurality of story selector buttons for selecting a story concerning the birth or death of Christ.

5. The simulated telephone toy device according to claim 4, wherein each button of the plurality of buttons in said third set of buttons includes an iconic symbol for indicating a story for selection.

6. The simulated telephone toy device according to claim 1, wherein said indicia on said left side has an appearance resembling a child's script.

7. The simulated telephone toy device according to claim 1, further comprising circuitry disposed internally of said base, said circuitry being responsive to actuation of said first, second and third sets of buttons for outputting audible messages corresponding to each of said buttons.

8. The simulated telephone toy device according to claim 7, wherein said circuitry includes a control processor, a non-volatile memory module, an audio processor and amplifier, input means coupled to each of said buttons for actuating said control processor, output means responsive to said audio processor and amplifier for generating audible tones, and a power supply.

9. The simulated telephone toy device according to claim 8, wherein said non-volatile memory module stores a plurality of prerecorded biblical messages, and wherein said output means comprises a speaker.

10. A toy device for teaching biblical principles to children by rote comprising:
   a housing base formed from rigid material in the shape of an open Bible, said housing base having a cradle on a surface thereof, said housing base also including a speaker port for allowing audible tones to pass therethrough, and said housing base having an input keypad;
   electronic circuit means responding to said input keypad and outputting said audible tones via said speaker port, said electronic circuit means disposed internally of said housing base;
   a simulated pair of praying hands removably seated in said cradle; and
   a tether coupled between said housing base and said simulated pair of praying hands.

11. The toy device according to claim 10, wherein said electronic circuit means includes a processor, a memory module, an audio amplifier, and a means for supplying power.

12. The toy device according to claim 11, wherein said memory module stores a plurality of prerecorded biblical messages.

13. A device for teaching biblical principles to children by rote comprising:
   a base member shaped in the form of an open Bible, said base member having a top surface;
   said base having means for coupling;
   said base including a power supply compartment, said power supply compartment including means for selectively accessing said compartment;
   said top surface including a first side and a second side;
      said first side having a cradle defined therein, said cradle having apertures for passing audible tones therethrough, said first side further having indicia thereon;
      said second side having a first set of buttons, a second set of buttons, and a third set of buttons;
         said first set of buttons for selecting a category;
         said second set of buttons for selecting a topic within the category;
         said third set of buttons for selecting a story;
   a tether having a first end and a second end, said first end connected to said means for coupling;
   a simulated receiver coupled to said second end of said tether; and
   circuitry disposed internally of said base, said circuitry being responsive to actuation of said first, second and third sets of buttons for outputting audible messages corresponding to each of said buttons;
      wherein said second set of buttons includes ten enumerated buttons, and said indicia on said first side has an appearance of a child's script.

14. The device for teaching biblical principles to children by rote according to claim 13, wherein said circuitry includes a control processor, a non-volatile memory module, an audio processor and amplifier, input means coupled to each of said buttons for actuating said control processor, output means responsive to said audio processor and amplifier for generating audible tones, and a power supply.

15. The device for teaching biblical principles to children by rote according to claim 14, wherein said non-volatile memory module stores a plurality of prerecorded biblical messages, and wherein said output means comprises a speaker.

16. The device for teaching biblical principles to children by rote according to claim 15, wherein said audio processor and amplifier convert said pre-recorded biblical messages from said non-volatile memory module into audible tones to be listened to and repeated by a child.

* * * * *